(12) United States Patent
Tanaka

(10) Patent No.: US 12,341,936 B2
(45) Date of Patent: Jun. 24, 2025

(54) IMAGE FORMING APPARATUS CAPABLE OF FORMING COMBINABLE IMAGES ON SEPARATE SHEETS

(71) Applicant: BROTHER KOGYO KABUSHIKI KAISHA, Nagoya (JP)

(72) Inventor: Tomohiro Tanaka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 88 days.

(21) Appl. No.: 18/308,139

(22) Filed: Apr. 27, 2023

(65) Prior Publication Data

US 2023/0388430 A1 Nov. 30, 2023

(30) Foreign Application Priority Data

May 27, 2022 (JP) .................................. 2022-086697

(51) Int. Cl.
*H04N 1/387* (2006.01)
*H04N 1/00* (2006.01)

(52) U.S. Cl.
CPC ..... *H04N 1/00917* (2013.01); *H04N 1/00413* (2013.01); *H04N 1/0044* (2013.01); *H04N 1/00655* (2013.01)

(58) Field of Classification Search
CPC ............. H04N 1/00917; H04N 1/0044; H04N 1/00655; H04N 1/00652

USPC .......... 358/1.13, 1.12, 1.18; 271/7, 256, 270
See application file for complete search history.

(56) References Cited

U.S. PATENT DOCUMENTS

| | | | | |
|---|---|---|---|---|
| 2015/0170011 A1* | 6/2015 | Hattori | .................. | G06F 3/1234 358/1.6 |
| 2020/0097236 A1* | 3/2020 | Miyadome | ............ | G06F 3/1207 |

FOREIGN PATENT DOCUMENTS

| | | | | | |
|---|---|---|---|---|---|
| JP | 2004-188760 A | | 7/2004 | | |
| JP | 2006272764 A | * | 10/2006 | ......... | H01R 13/6315 |
| JP | 2013-078905 A | | 5/2013 | | |

* cited by examiner

*Primary Examiner* — Jamares Q Washington
(74) *Attorney, Agent, or Firm* — Merchant & Gould P.C.

(57) ABSTRACT

An image forming apparatus, having a medium storage, a medium conveyer, an image forming device, a user input interface, and a controller, is provided. The controller operates the image forming device and the medium conveyer to perform a first action to form an image composed of image data in an area on a sheet-formed medium from one side of the image in a lengthwise direction, which corresponds to the predetermined conveying direction. On a condition where the first action is aborted, the controller operates the image forming device and the medium conveyer to perform a second action to form an image composed of the image data in another area on the sheet-formed medium different from the area in which the image was formed in the first action until a time point instructed by input from a user accepted through the user input interface.

8 Claims, 8 Drawing Sheets

IMAGE FORMING APPARATUS CAPABLE OF FORMING COMBINABLE IMAGES ON SEPARATE SHEETS

REFERENCE TO RELATED APPLICATIONS

This application claims priority from Japanese Patent Application No. 2022-086697 filed on May 27, 2022. The entire content of the priority application is incorporated herein by reference.

BACKGROUND ART

An image forming apparatus capable of forming images on sheet-formed printable media may occasionally be forced to suspend actions for forming the images due to various causes. For example, when an amount of ink to be used in the image forming apparatus is lowered to a predetermined amount, the image forming apparatus may tentatively continue the image forming action to a point, at which the action may be rounded up, and thereafter, when the action comes to the round-up point, the image forming apparatus may suspend the action. Then, a container of the consumed ink may be exchanged with a new one, and the image forming action may be resumed.

DESCRIPTION

When the image forming action is suspended, a quality level of the image formed tentatively before the suspension may be lowered. For example, while the image is being formed in ink, when the remaining amount of the ink is lowered but the image forming action is continued tentatively, the image may not be formed in the substantial amount of the ink to satisfy the quality level. In such a case, when the image forming action is resumed, with the exchanged ink container and with the quality level of the image forming being regained to form the remainder of the image on the sheet-formed medium, the part of the image formed tentatively before the suspension may be left uncured in the lower quality level.

The present disclosure is advantageous in that an image forming apparatus, which may, even after an image forming action is suspended and the image forming quality is lowered tentatively, resume forming of the remainder of the image and maintain a quality level of an image as a whole, is provided.

FIRST EMBODIMENT

A printer 100 according to a first embodiment of the present disclosure will be described below with reference to FIGS. 1-7. In the embodiment described below, directions in the printer 100 are defined with reference to orientations indicated as up, down, right, left, front, rear by bi-directionally pointing arrows shown in FIG. 1. A front-to-rear or rear-to-front direction may be called a front-rear direction, an up-to-down or down-to-up direction may be called a vertical direction, and a left-to-right or right-to-left direction may be called a widthwise direction.

Figure 1:
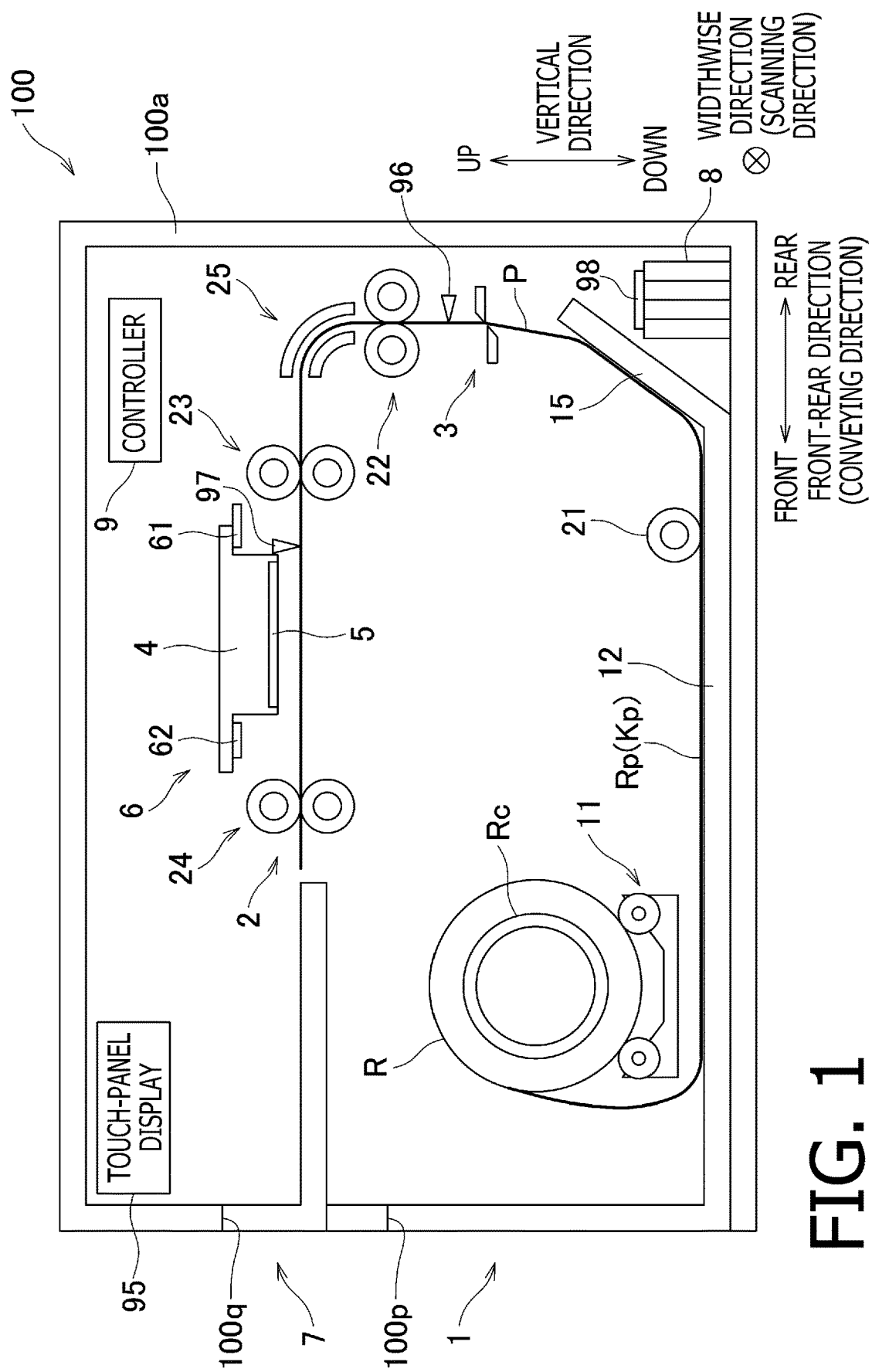
FIG. 1 is a schematic side view showing an inner structure of a printer.
Figure 2:
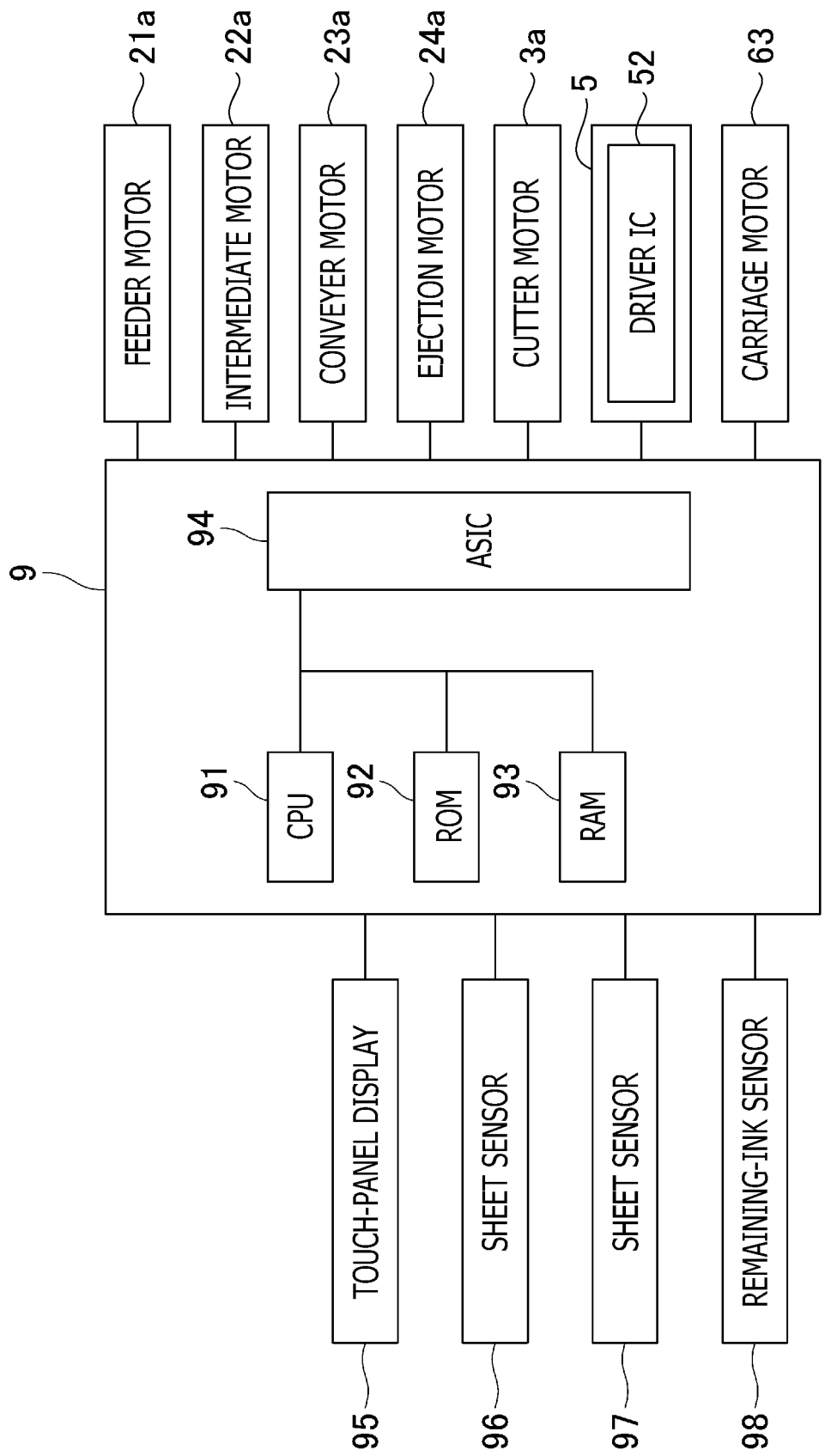
FIG. 2 is a block diagram illustrating an electrical configuration of the printer.

The printer 100 includes, as shown in FIGS. 1 and 2, but not necessarily limiting, a housing 100a, a feeder tray 1, a conveyer 2, a cutter 3, a carriage 4, a head 5, a movable assembly 6, an ejection tray 7, and a controller 9.

The feeder tray 1 is located in the housing 100a at a position below the head 5. The feeder tray 1 may be drawn in and out from the housing 100a along the front-rear direction through an opening 10p formed on a front side of the housing 100a.

The feeder tray 1 may accommodate a roll R and/or cut sheets Kp. The feeder tray 1 may accommodate both the roll R and the cut sheets Kp at the same time or may accommodate either one of the roll R and the cut sheets Kp selectively. The feeder tray 1 includes a roll holder 11 to support the roll R and a placement surface 12, on which the cut sheets Kp may be placed.

The roll R may consist of a core Rc having a cylindrical form and an elongated sheet Rp of paper rolled around the core Rc. The cut sheet Kp includes a sheet of paper, of which length is shorter than a length of the sheet of paper in the roll R, and may be a sheet in a standard size such as, for example, A4 or B5. In the present embodiment, a maximum size of the cut sheets Kp usable in the printer 100 among usable sizes of the cut sheets Kp is the A4 size. The cut sheets Kp may be stacked in layers on the placement surface 12.

The conveyer 2 may convey a sheet P along a conveyer path, which is a path along a thicker line representing the sheet P in FIG. 1, from the feeder tray 1 through the head 5 to the ejection tray 7. In the description below, terms "upstream" and "downstream" are used with reference to a conveying direction to convey the sheet P by the conveyer 2 from the feeder tray 1 to the ejection tray 7 along the conveyer path. The conveyer 2 includes a feeder roller 21, an intermediate roller pair 22, a conveyer roller pair 23, an ejection roller pair 24, and a guide 25. The feeder roller 21, the intermediate roller pair 22, the conveyer roller pair 23, and the ejection roller pair 24 are arranged in this given order from upstream to downstream along the conveyer path.

The feeder roller 21 may feed a sheet P from the feeder tray 1. The sheet P may either be the rolled sheet Rp extended from the roll R supported by the roll holder 11 or the cut sheet Kp placed on the placement surface 12. In the following context, when the rolled sheet Rp and the cut sheets Kp may not necessarily make difference, the rolled sheet Rp and the cut sheet Kp may be collectively called "sheet P."

The feeder roller 21 may be driven by a feeder motor 21a (see FIG. 2) to rotate. When the feeder motor 21a is activated under the control of the controller 9, the feeder roller 21 may rotate and apply a conveying force to convey the sheet P, which is in contact with the feeder roller 21, in a direction from front to rear. Thereby, the sheet P may be conveyed from the feeder tray 1. A rear wall 15 formed at a rear end of the feeder tray 1 slants upper-rearward so that an upper end of the rear wall 15 is located rearward with respect to a lower end of the rear wall 15. In this arrangement of the rear wall 15, the sheet P conveyed from the feeder tray 1 may be directed upper-rearward.

The intermediate roller pair 22 consists of a driving roller that may be driven by an intermediate motor 22a (see FIG. 2) to rotate and a driven roller that may be rotated by the rotation of the driving roller. As the intermediate motor 22a is activated under the control of the controller 9, the intermediate roller pair 22 may nip the sheet P and rotate to convey the sheet P. The intermediate roller pair 22 is located above the rear end of the feeder tray 1. The intermediate roller pair 22 may nip the sheet P fed from the feeder tray 1 by the feeder roller 21 and directed upper-rearward by the rear wall 15 to convey upward. The guide 25 is located above the intermediate roller pair 22. The guide 25 may guide the sheet P conveyed upward by the intermediate roller pair 22 to be conveyed frontward.

The conveyer roller pair 23 consists of a driving roller that may be driven to rotate by a conveyer motor 23a (see FIG. 2) and a driven roller that may be rotated by the rotation of the driving roller. The ejection roller pair 24 consists of a driving roller that may be driven by an ejection motor 24a (see FIG. 2) to rotate and a driven roller that may be rotated by the rotation of the driving roller.

As the conveyer motor 23a and the ejection motor 24a are driven under the control of the controller 9, the conveyer roller pair 23 and the ejection roller pair 24 may nip the sheet P and rotate to convey the sheet P frontward, i.e., downstream in the conveying direction. The conveyer roller pair 23 is located rearward with respect to the head 5, and the ejection roller pair 24 is located frontward with respect to the head 5. The conveyer roller pair 23 may convey the sheet P guided frontward by the guide 25 further frontward toward the ejection roller pair 24. The ejection roller pair 24 may nip the sheet P conveyed frontward by the conveyer roller pair 23 further frontward at the ejection tray 7 to eject outside the housing 100a.

Along the conveyer path, sheet sensors 96, 97 to detect presence of the sheet P in the conveyer path are arranged. The sheet sensor 96 is located at a position substantially lower than the intermediate roller pair 22, and the sheet sensor 97 is located at a position substantially frontward with respect to the conveyer roller pair 23. The controller 9 may detect sheet jam, where the sheet P stays in the conveyer path without being conveyed, based on outputs from the sheet sensors 96, 97.

The cutter 3 is located upstream with respect to the intermediate roller pair 22 at a position between the rear end of the feeder tray 1 and the intermediate roller pair 22 in the conveyer path. The cutter 3 may consist of, for example, a disc-formed rotary blade and a subsidiary blade. As a cutter motor 3a (see FIG. 2) is activated, the cutter 3 may reciprocate in the widthwise direction, and the rotary blade may rotate. The rolled sheet Rp extended from the roll R in the conveyer path may be cut by the cutter 3 along a crosswise direction of the rolled sheet Rp while the cutter motor 3a is active under the control of the controller 9. Thereby, a rear end of the rolled sheet Rp is created, and the rolled sheet Rp cut off may be ejected at the ejection tray 7.

The head 5 has a plurality of nozzles, which are formed on a lower face of the head 5, and a driver IC 52 (see FIG. 2). As the driver IC 52 is activated under the control of the controller 9, ink may be discharged from the nozzles, and the ink landing on the sheet P may form dots. The head 5 is mounted on the carriage 4.

The movable assembly 6 includes two guide rails 61, 62 and a carriage motor 63 (see FIG. 2). The guide rails 61, 62 are spaced apart from each other in the front-rear direction and extend in the widthwise direction. The carriage 4 is arranged to straddle the guide rail 61 and the guide rail 62.

The carriage 4 is connected to the carriage motor 63 through, for example, a belt (not shown). As the carriage motor 63 is activated under the control of the controller 9, the carriage 4 may move in a scanning direction, i.e., the widthwise direction, along the guide rails 61, 62. The carriage 4 may move in one way for a run and in the other way for another run in the scanning direction to reciprocate in the scanning direction.

While the head 5 on the carriage 4 reciprocates in the scanning direction and discharges the ink from the nozzles, dots are formed in lines on the sheet P along the scanning direction. Thus, the lines of dots along the scanning direction are formed on the sheet P sequentially while the sheet P is conveyed by the conveyer 2. Accordingly, in an image-formable range on the sheet P, an image, in which the dots are arrayed along the scanning direction and the conveying direction, may be formed. The image-formable range may be a rectangular range corresponding to a size of the image.

The ejection tray 7 is located at a position frontward with respect to the head 5 and above the feeder tray 1 in the housing 100a. The ejection tray 7 may be drawn inside and outside the housing 100a along the front-rear direction through the opening 100q formed on the front side of the housing 100a. The sheet P, with the image formed thereon by the head 5, may rest in the ejection tray 7.

A cartridge attachment section 8 is arranged inside the housing 100a. To the cartridge attachment section 8, four ink cartridges containing inks in colors of black, yellow, cyan, and magenta may be detachably attached. The inks in the cartridges attached to the cartridge attachment section 8 may be supplied to the head 5 through, for example, tubes. In the cartridge attachment section 8, a remaining-ink sensor 98 to detect remaining amounts of the inks in the four ink cartridges is provided. The controller 9 may obtain the remaining amounts of the inks in the ink cartridges based on outputs from the remaining-ink sensor 98.

On the front face of the housing 100a, a touch-panel display 95 is arranged. The touch-panel display 95 may display images and text on a screen thereof under the control of the controller 9. Further, the touch-panel display 95 may detect a position on the screen touched by a user and output the detected position to the controller 9.

The controller 9 may control overall behaviors of the printer 100. As shown in FIG. 2, the controller 9 is electrically connected with the feeder motor 21a, the intermediate motor 22a, the conveyer motor 23a, the ejection motor 24a, the cutter motor 3a, the driver IC 52, the carriage motor 63, the touch-panel display 95, the sheet sensors 96, 97, and the remaining-ink sensor 98.

The controller 9 includes, as shown in FIG. 2, a central processing unit (CPU) 91, a read-only memory (ROM) 92, a random access memory (RAM) 93, an application specific integrated circuit (ASIC) 94. The ROM 92 may store programs to be run by the CPU 91 and the ASIC 94. The RAM 93 may store data to be used in the running programs temporarily. The data may include image data composing an image, which may be transmitted from an external device such as a PC or may be acquired from a memory medium.

Optionally, the controller 9 may have the CPU 91 alone or the ASIC 94 alone to conduct the processes or may have the CPU 91 and the ASIC 94 cooperating with each other to conduct the processes. Optionally, moreover, the controller 9 may have a single CPU 91 that may conduct the processes or may have a plurality of CPUs 91 sharing the processes. Optionally, moreover, the controller 9 may have a single ASIC 94 that may conduct the processes or may have a plurality of ASICs 94 sharing the processes.

The controller 9 may execute a regular printing control to operate the conveyer 2, the cutter 3, and the head 5 to perform a regular printing action. For the regular printing action, the controller 9 may repeat an act of operating the conveyer 2 to convey the sheet P along the conveyer path by a predetermined distance and an act of operating the movable assembly 6 to move the carriage 4 in the scanning direction and the head 5 to discharge the ink from the nozzles at the sheet P alternately, based on the image data stored in the RAM 93.

Figure 3:
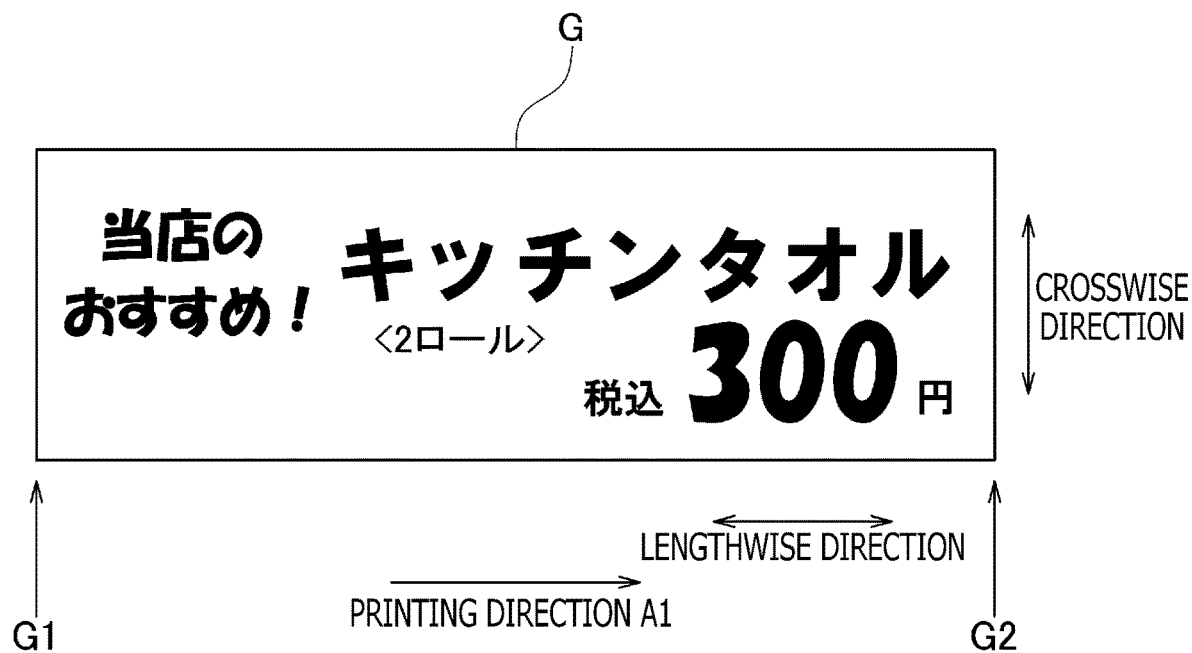
FIG. 3 is an example of an image formed on a sheet in a regular printing action performed by the printer.

When the sheet P is the rolled sheet Rp, the rolled sheet Rp may be extended and conveyed by the conveyer 2, and the inks may be discharged from the head 5 at the extended sheet Rp being conveyed. The extended sheet Rp may be cut in a predetermined length by the cutter 3 operated under the control of the controller 9. The extended sheet Rp cut off by the cutter 3 may be ejected into the ejection tray 7 as a sheet P of paper having the predetermined length with the image formed thereon. FIG. 3 illustrates an image G formed on the extended sheet Rp in the regular printing action. The image G may be longer in a lengthwise direction being parallel to the conveying direction, in which the rolled sheet Rp may be extended and conveyed by the conveyer 2. The image G may be formed on the extended sheet Rp starting from a position closer to one end G1 of the extended sheet Rp along a printing direction A1, which is parallel to the conveying direction, toward the other end G2 of the extended sheet Rp in the lengthwise direction.

When the sheet P is the cut sheet Kp, the cut sheet Kp may be conveyed by the conveyer 2, and the inks may be discharged from the head 5 at the cut sheet Kp being conveyed. Accordingly, the cut sheet Kp may be ejected into the ejection tray 7 with the image formed thereon.

When an error, such as shortage of the ink or sheet jam, which may disrupt the regular printing action is detected in the outputs from the sheet sensors 96, 97 and/or the remaining-ink sensor 98, the controller 9 may suspend the regular printing action. The causes to suspend the regular printing action may include, for another example, electric outage, being unplugged from a power outlet, and so on.

Figure 4:
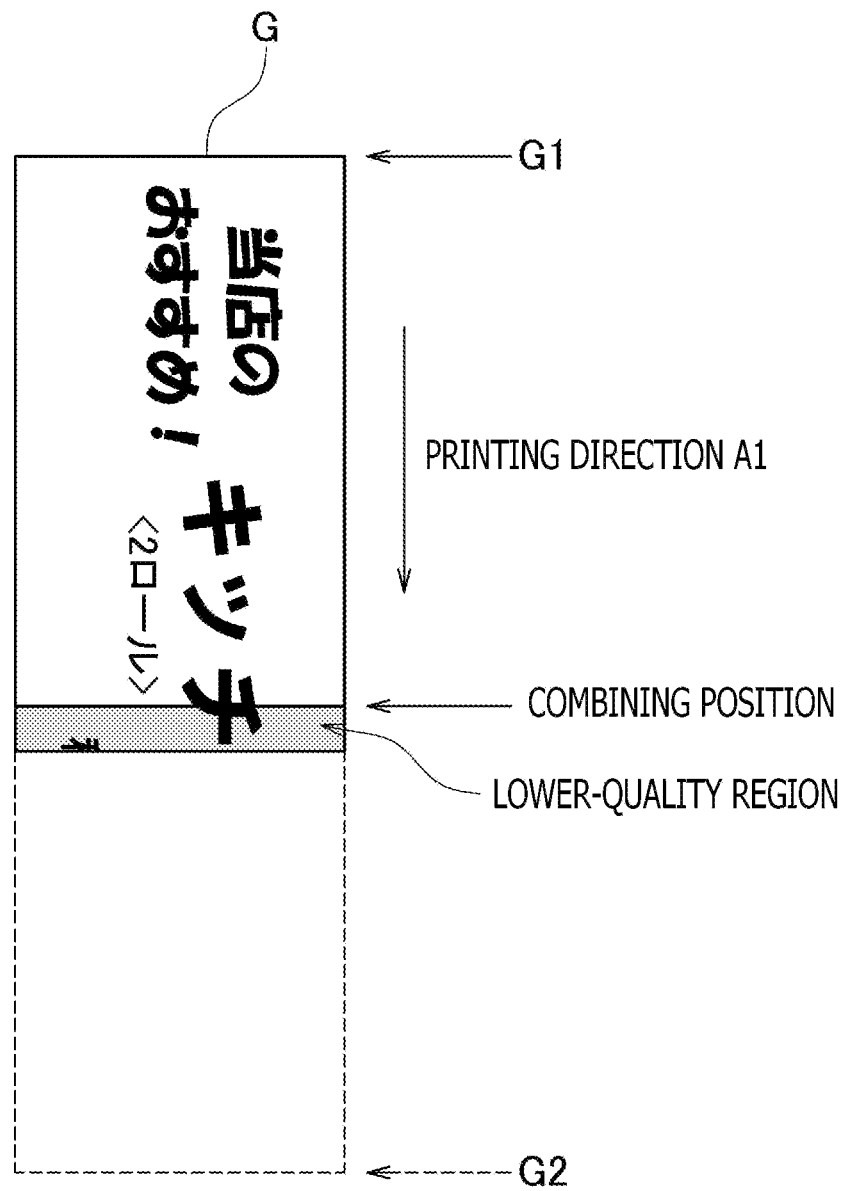
FIG. 4 illustrates an appearance of the image being formed on a sheet by the time immediately before the regular printing action is suspended.

FIG. 4 illustrates an appearance of the image G being formed on the extended sheet Rp immediately before a regular printing action to form the image G is suspended. As shown in FIG. 4, the image G is discontinued at an intermediate position between the one end G1 and the other end G2 in the extended sheet Rp. Meanwhile, depending on the cause to suspend the regular printing action, a quality level of the image G may be lowered at a part formed immediately before the suspension, e.g., the shaded region shown in FIG. 4. For example, when the regular printing action is suspended due to shortage of one or more of the inks, the image G may not be formed in the substantial amount of the inks to satisfy the quality level at the part having been formed immediately before the abortion. When the regular printing action is suspended due to the ink shortage, the user may exchange the consumed ink cartridge with a new ink cartridge. Thereby, the cause to lower the quality level of image forming may be cleared, and the regular printing action may be resumed. However, as the regular printing action resumes from the position at the end of the part having been formed immediately before the suspension, the quality level of the image forming at the part having been formed immediately before the suspension may be left uncured.

In this regard, according to the present embodiment, the controller 9 aborts the regular printing control and shifts to a supplemental printing control, in which the controller 9 operates the conveyer 2, the cutter 3, and the head 5 to perform a supplemental printing action.

Figure 5:
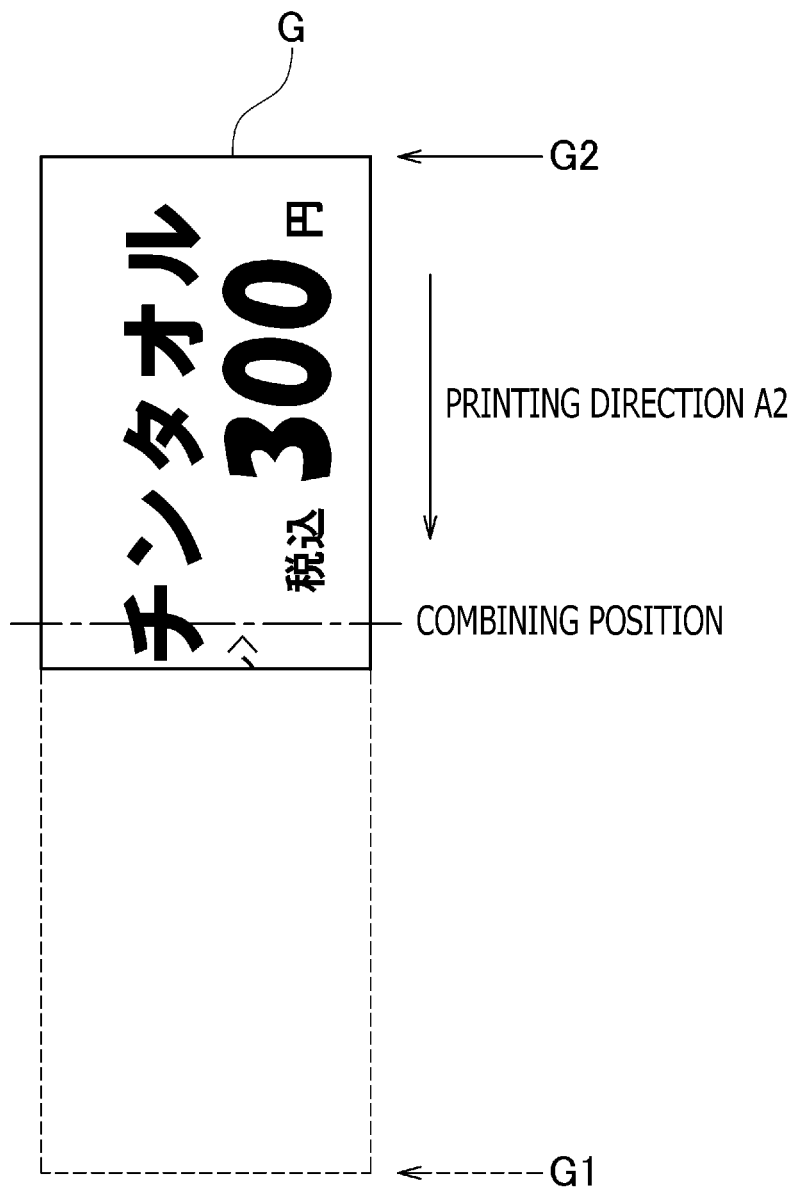
FIG. 5 illustrates an appearance of the image being formed on a sheet in a supplementary printing action after the suspension of the regular printing action.

The supplemental printing control may be conducted in the following manners. When the rolled sheet Rp is used as the sheet P, once the regular printing action is aborted, the extended part of the rolled sheet Rp in which the abortion occurred may be cut off, and the supplemental printing action may be performed on another part of the rolled sheet Rp following the preceding part of the rolled sheet Rp having been cut. When the cut sheet Kp is used as the sheet P, once the regular printing action is aborted, the cut sheet Kp in which the abortion occurred may be ejected, and the supplemental printing action may be performed on the cut sheet Kp being conveyed next to the cut sheet Kp having been ejected. In the supplemental printing action, the controller 9 may repeat the act of operating the conveyer 2 to convey the sheet P along the conveyer path by the predetermined distance and the act of operating the movable assembly 6 to move the carriage 4 in the scanning direction and the head 5 to discharge the inks from the nozzles at the sheet P alternately, based on the image data stored in the RAM 93. During the supplemental printing action, the controller 9 may control the conveyer 2 to convey the sheet P at a speed lower than a speed to convey the sheet P in the regular printing action. The controller 9 may operate the conveyer 2, the movable assembly 6, and the head 5 to form the image G on the sheet P in a reverse direction, starting from a position closer to the other side of the image G opposite to the one side where forming of the image G started in the regular printing action. FIG. 5 illustrates the image G being formed in the supplemental printing action conducted after the regular printing action is aborted at the position as show in FIG. 4. As shown in FIG. 5, the image G may be formed on the sheet P along a printing direction A2, which is reversed from the printing direction A1 in the regular printing action, starting from a position closer to the other end G2 being on the opposite side to the one end G1, which was on the starting side in the aborted regular printing action.

Figure 6A:
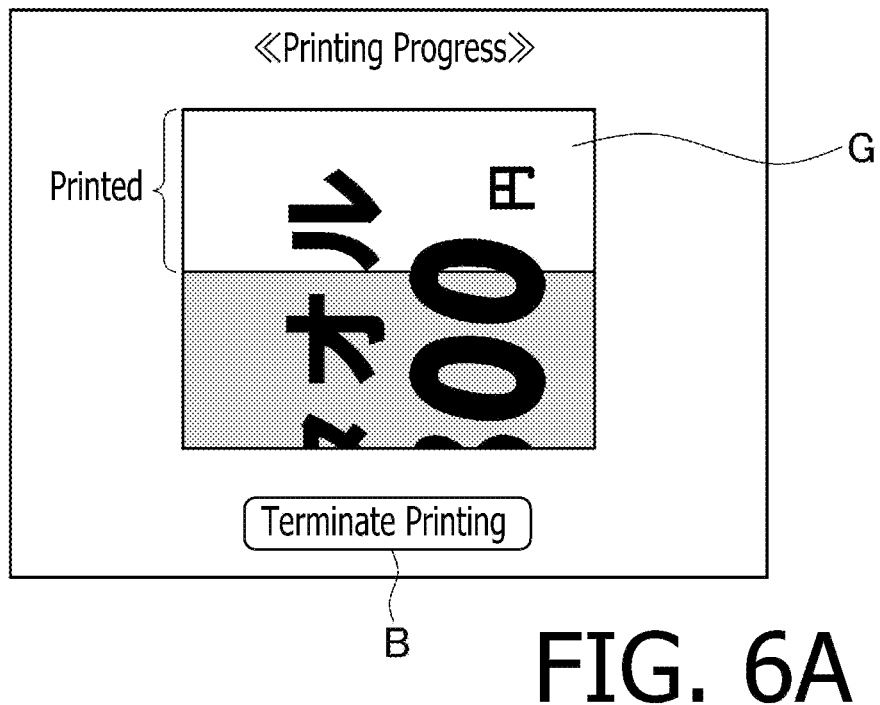
FIGS. 6A-6B illustrate screens showing progress of image forming to be displayed in a touch-panel display.
Figure 6B:
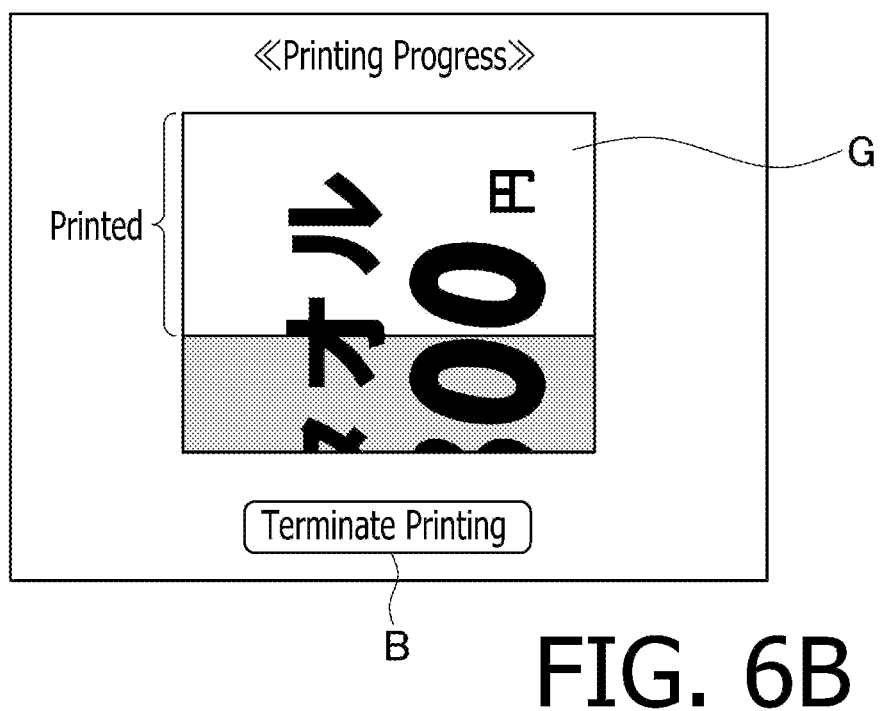

While the controller 9 continues to operate the conveyer 2, the movable assembly 6, and the head 5 to perform the supplemental printing action, the controller 9 may simultaneously control the touch-panel display 95 to display a screen illustrating a part of the image G having been formed on the sheet P so far in the supplemental printing action, as shown in FIGS. 6A-6B. The screens shown in FIGS. 6A-6B each contain the part of the image G having been formed so far in the supplemental printing action and a button image B labeled "Terminate Printing." If the user touches an area containing the button image B in the touch-panel display 95, the controller 9 may determine that the button image B is operated. Meanwhile, the image G is partly shaded: the shaded area expresses an unprinted range in the image G, and the area without the shading expresses a printed range in the image G. The contents of the screen being displayed may be refreshed according to the progress of the image G being formed in the supplemental printing action. For example, FIG. 6B illustrates a later screen, in which the unprinted range is smaller, in other words, the image G is printed further than the image G in the screen shown in FIG. 6A. The user may monitor the screen in the touch-panel display 95 and determine a time point when to terminate the supplemental printing action according to the progress. The user determining that the supplemental printing action is to be terminated may touch the area containing the button image B in the touch-panel display 95 to input the instruction for the termination of the supplemental printing action.

The time point to terminate the supplemental printing action may be at any point later than a point, at which the image G is printed to a combining position, e.g., a combining position shown in FIG. 5. The combining position is a position, at which the latter image G printed in the supplemental printing action may be combined to the former image G printed earlier in the aborted regular printing action through a manual combining work as described below. Thus, the controller 9 may control the conveyer 2, the movable assembly 6, and the head 5 to continue the supplemental printing action until the button image B is operated by the user. When the button image B is operated, the controller 9 may operate the conveyer 2, the movable assembly 6, and the head 5 to terminate the supplemental printing action. It may be preferable that supplemental printing action is terminated as soon as the button image B is operated; however, there may be a time lag between the user's operation and the actual termination due to operational or mechanical causes. It may be noted that the latter image G printed in the supplemental printing action and the former image G printed earlier in the aborted regular printing action may be partly identical. That is, the contents in a downstream area in the printing direction A1 in the former image G formed in the aborted regular printing action and the contents in a downstream area in the printing direction A2 in the latter image G formed in the supplemental printing action may be identical, except the level of the image forming quality.

According to the supplemental printing control described above, the latter image G continuous from the former image G printed in the aborted regular printing action may be printed on the sheet P. When the rolled sheet Rp is used as the sheet P, the rolled sheet Rp with the latter image G printed thereon may be cut off by the cutter 3 and ejected into the ejection tray 7. When the cut sheet Kp is used as the sheet P, the cut sheet Kp with the latter image G printed thereon may be ejected into the ejection tray 7.

Thus, the user may obtain a combined sheet P, in which the image G formed in the regular printing action and the image G formed in the supplemental printing action are cut and bonded. For example, in the user's combining work, the preceding sheet P ejected earlier may be cut at a position to discard the lower-quality part of the image formed in the regular printing action, in which the quality level is lowered. For example, the preceding sheet P may be cut at the combining position shown in FIG. 4. Further, the succeeding sheet P ejected later may be cut at a position where the latter the image G formed in the supplemental printing action may match with the edge of the former image G formed on the preceding sheet P in the regular printing action. For example, the sheet P may be cut at the combining position shown in FIG. 5. The preceding and succeeding sheets P may be fixed to each other by, for example, an adhesive tape, in an arrangement such that the edges thereof abut each other. Accordingly, the entire image G may appear on the combined sheets P without being separated. Meanwhile, optionally, at least one of the sheets P may be cut at a position downstream in the printing direction A1/A2 with respect to the combining position so that the part of the sheet P between the combining position and the cutoff edge may be used as an overlap margin to be combined with the other one of the sheets P.

Figure 7A:
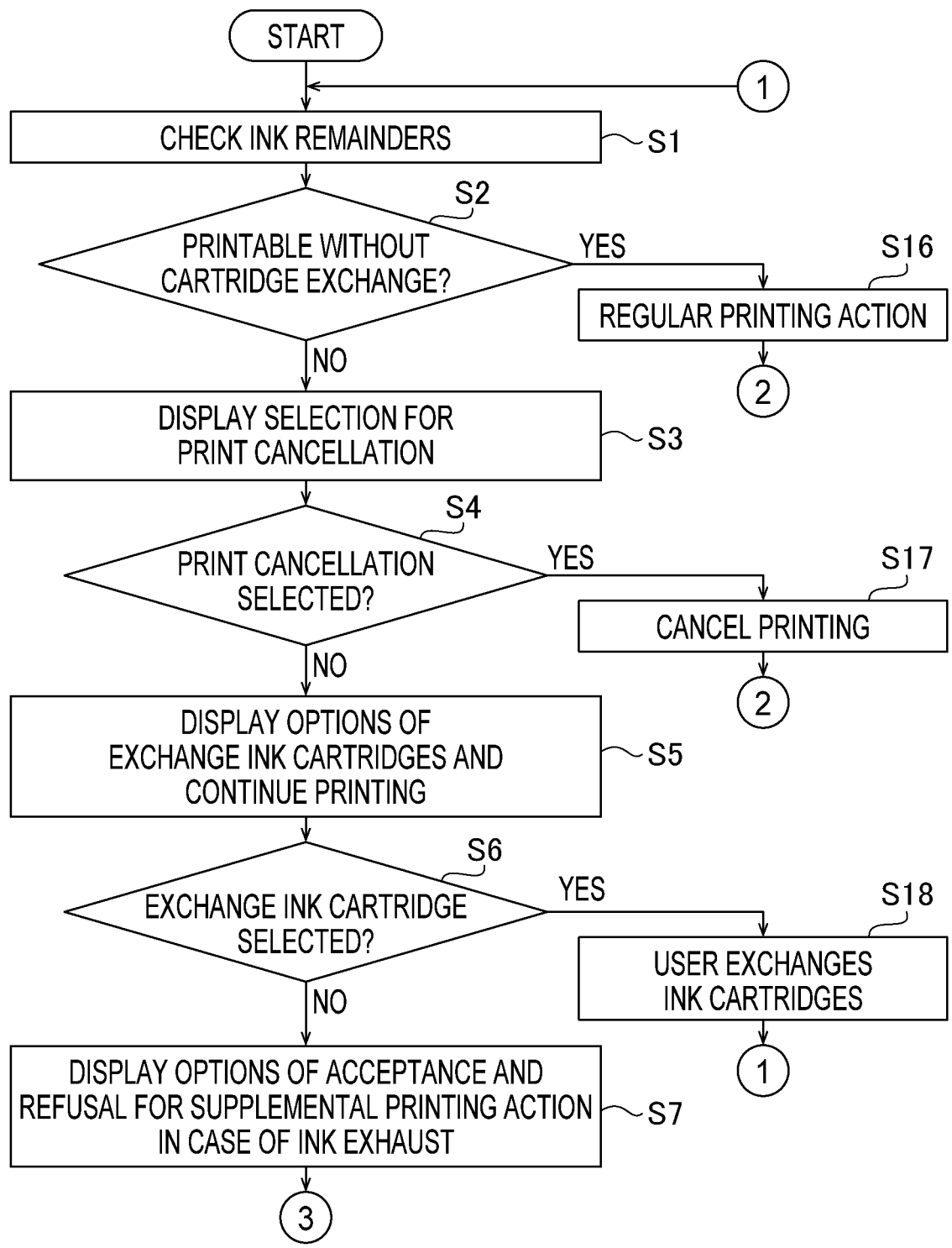
FIGS. 7A-7B show a flowchart to illustrate flows of image forming process in the printer.
Figure 7B:
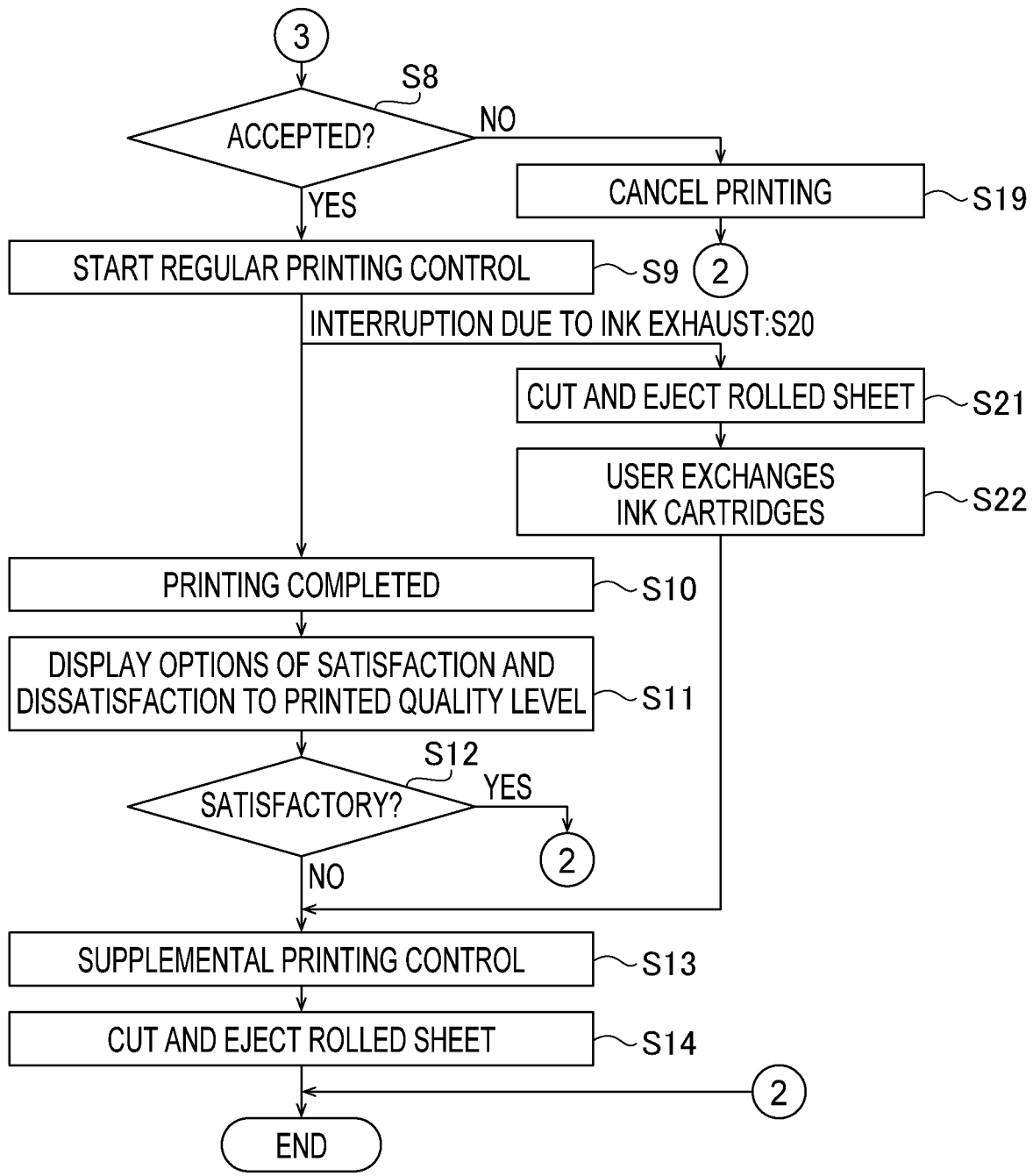

In the following paragraphs, flows of the regular printing control and the supplemental printing control executed by the controller 9 will be described below with reference to FIGS. 7A-7B. FIGS. 7A-7B show a flowchart illustrating flows of the regular printing control and the supplemental printing control that may be executed by the controller 9 when the rolled sheet Rp is used as the sheet P. First, based on the outputs from the remaining-ink sensor 98 and the image data stored in the RAM 94, the controller 9 determines whether the amounts of the inks in the ink cartridges are sufficient to complete the regular printing action to form the image G according to the image data without exchanging of the ink cartridges (S1).

If the controller 9 determines that the amounts of the inks in the ink cartridges are sufficient to complete the regular printing action (S2: YES), the controller 9 conducts the regular printing action (S16) and ends the control.

If the controller 9 determines that at least one of the amounts of the inks in the ink cartridges is insufficient to complete the regular printing action (S2: NO), the controller 9 operates the touch-panel display 95 to display a screen, through which the user may select whether the printing action is cancelled or continued, and awaits the user's input (S3). If the controller 9 determines that the user selects cancellation of the printing action based on the user's input to the touch-panel display 95 displayed in S3 (S4: YES), the controller 9 cancels the printing action (S17) and ends the control.

In S4, if the controller 9 determines that the user selects to continue the printing action based on the user's input to the touch-panel display 95 displayed in S3 (S4: NO), the controller 9 operates the touch-panel display 95 to display a screen, through which the user may select exchanging of the at least one of the ink cartridges or proceeding to the printing action without exchanging the at least one of the ink cartridges, and awaits the user's input (S5). In S6, if the controller 9 determines that the user selects to exchange the at least one of the ink cartridges with new one(s) (S6: YES), the controller 9 awaits until the user's exchanging work is completed (S18) and thereafter returns to S1.

In S6, if the controller 9 determines that the user selects to proceed to the printing action without exchanging the at least one of the ink cartridges with new ink cartridge(s) (S6: NO), the controller 9 operates the touch-panel display 95 to display a screen, through which the user may select whether to accept or refuse a supplemental process in case the ink(s) is exhausted during the printing action, and awaits the user's input (S7). The screen to be displayed in S7 may include, for example, a message, such as "If the ink runs out in midst of the printing action, you may need to exchange the ink cartridge with a new ink cartridge, and the remaining part of the image may be printed afterward. After the remaining part is printed, you may need to combine the sheets having the split images together manually", and button images labeled as "Accept" and "Refuse", through which the user may express his/her preference for the supplemental process.

In S8, if the controller 9 determines that the user selects to refuse the supplemental process based on the user's input through the touch-panel display 95 (S8: NO), the controller 9 cancels the printing action (S19) and ends the control. In S8, if the controller 9 determines that the user selects to accept the supplemental process based on the user's input through the touch-panel display 95 (S8: YES), the controller 9 proceeds to the regular printing control (S9). The regular printing action may or may not be completed without being aborted depending on the inks to be used in the image G. If the regular printing action is completed without being aborted, i.e., the entire image G is formed on the rolled sheet Rp, and the rolled sheet Rp is cut and conveyed to the ejection tray 7 (S10), the controller 9 operates the touch-panel display 95 to display a screen, through which the user may or may not confirm the quality level of the image formed on the ejected sheet P to be satisfactory, and awaits the user's input (S11). If the controller 9 determines that the user confirms the satisfactory quality level of the image formed on the ejected sheet P based on the user's input to the touch-panel display 95 in S11 (S12: YES), the controller 9 ends the control.

If the controller 9 determines that the user is unsatisfied with the quality level of the image formed on the ejected sheet P based on the user's input to the touch-panel display 95 in S11 (S12: NO), the controller 9 proceeds to the supplemental printing control (S13). In the supplemental printing control, the controller 9 operates the cutter 3 to cut the rolled sheet Rp with the latter image G printed thereon in the supplemental printing action and operates the conveyer 2 to eject the sheet P into the ejection tray 7 (S14). The controller 9 ends the control.

As the image G is being formed in the regular printing action between S9 and S10, the ink may be exhausted, and the remaining-ink sensor 98 may detect the exhaust of the ink. If the controller 9 determines that the ink exhausted based on the outputs from the remaining-ink sensor 98, the controller 9 shifts to an interrupting process and aborts the regular printing action (S20). Accordingly, the controller 9 operates the cutter 3 to cut the rolled sheet Rp off from the roll R and operates the conveyer 2 to eject the cutoff sheet P into the ejection tray 7 (S21). The controller 9 awaits until the user's exchanging work is completed (S22) and proceeds to the supplemental printing control in S13 and onward.

According to the embodiment described above, the regular printing action may be aborted in midst of forming of the image G, and, the supplemental printing action to form the remainder of the image G from the side opposite to the starting side in the regular printing action may be performed in the reversed order. While the quality level of the image may be lowered in the region in the image G formed immediately before the regular printing action is aborted, an act to restore the quality level for forming the image G, e.g., exchange of the ink cartridge, may be performed between the abortion of the regular printing action and starting of the supplemental printing action. Finally, the user may have the sheet P, on which the entire image G is formed, by cutting and combining the image formed in the regular printing action and the image formed in the supplemental printing action. Therefore, while the quality level of the image may be lowered in the region in the image G formed immediately before abortion of the regular printing action, the unsatisfactory part of the image in the lower quality level may be discarded, and the part of the image left in the satisfactory quality level may be combined with the latter image formed in the supplemental printing action. Thus, the quality level of the image G as a whole may be secured.

Moreover, in the supplemental printing action according to the present embodiment, the user may monitor the image G being formed in the reversed order on the sheet P through the touch-panel display 95 and terminate the supplemental printing action with an input through the touch-panel display 95 when the user recognizes that a substantially supplemental part of the image G is formed on the sheet P. Therefore, the latter image G may be formed in the supplemental printing action in a suitable range to match with the former image G formed in the regular printing action.

Moreover, in the supplemental printing action, the sheet P may be conveyed in the reduced speed; therefore, the user may determine when to stop the supplemental printing action easily. Furthermore, the user may monitor the image being refreshed consecutively in the supplemental printing action through the touch-panel display 95 and determine when to terminate the supplemental printing action preferably.

Second Embodiment

A second embodiment of the present disclosure will be described below. The second embodiment may be different from the first embodiment in detail in the supplemental printing control, but the remainder of the second embodiment may be substantially similar to the first embodiment. In the following paragraphs, items that are substantially identical to those described in the first embodiment will be referred to by the same reference signs, and description of those items is herein omitted.

In the supplemental printing control in the first embodiment described above, the controller 9 operates the conveyer 2, the movable assembly 6, and the head 5 to perform the supplemental printing action continuously and operates the touch-panel display 95 to display the latter image G being formed on the sheet P simultaneously. In the second embodiment, on the other hand, the controller 9 operates the conveyer 2, the movable assembly 6, and the head 5 to perform the supplemental printing action intermittently. In particular, the controller 9 may repeat a series of acts of operating the conveyer 2 to convey the sheet P by the predetermined distance along the conveyer path, operating the movable assembly 6 to move the carriage 4 for one or more runs in the scanning direction and the head 5 to discharge the inks at the sheet P from the nozzles while moving in the scanning direction, and pausing. Meanwhile, the controller 9 may operate the touch-panel display 95 to display the latter image G being formed on the sheet P (see FIGS. 6A-6B). While the controller 9 pauses the action with the conveyer 2, the movable assembly 6, and the head 5, the controller 9 may operate the touch-panel display 95 to display a screen, through which the user may select whether the supplemental printing action is to be terminated or continued, and await the user's input. When the controller 9 determines that the user enters the selection to terminate the supplemental printing action through the touch-panel display 95, the controller 9 may terminate the supplemental printing control. On the other hand, when the controller 9 determines that the user enters the selection to continue the supplemental printing action through the touch-panel display 95, the controller 9 may continue the intermittent supplemental printing action. According to the second embodiment, the user may determine when to terminate the supplemental printing action while the image forming pauses deliberately.

Third Embodiment

A third embodiment of the present disclosure will be described below. The third embodiment may be different from the first and second embodiments in detail in the supplemental printing control, but the remainder of the third embodiment may be substantially similar to the first and second embodiments. In the following paragraphs, items that are substantially identical to those described in the first embodiment will be referred to by the same reference signs, and description of those items is herein omitted.

In the supplemental printing control according to the third embodiment, the controller 9 may operate the touch-panel display 95 to display the screen, through which the user may select when to terminate the supplemental printing action as well as the first and second embodiments; however, unlike the first embodiment or the second embodiment, the controller 9 may not operate the touch-panel display 95 to display the latter image G being formed on the sheet P. Rather, the user may directly monitor the image formed on the sheet P being ejected to determine when to terminate the supplemental printing action. When the user determines the time point to terminate the supplemental printing action, the user may operate the touch-panel display 95 to terminate the supplemental printing action.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, while the regular printing action and the supplemental printing action may be performed according to the image data stored in the RAM 94, the image data may not necessarily be entirely or completely stored in the RAM 94. For example, the regular printing action and the supplemental printing action may be performed once the entire image data is stored in the RAM 94 or may be performed sequentially as the image data is received portion by portion from, for example, an external device such as a PC. In supplemental printing action in the latter case, the portions of the image data may be transmitted from the external device in an order reversed from the order in the regular printing action.

For another example, when the regular printing action is aborted, the rolled sheet Rp may not necessarily be cut off or ejected before the supplemental printing action starts as shown in the flowchart in FIGS. 7A-7B. In other words, when the regular printing action is aborted, the rolled sheet Rp may not be cut off, but the supplemental printing action may be performed with the latter part of the rolled sheet Rp continuous from the former part of the rolled sheet Rp on which the regular printing action was performed. Thus, once the regular printing action is aborted, the image may be formed by the supplemental printing action in the area of the rolled sheet Rp different from the area, in which the former image G is formed in the regular printing action, regardless of the sheet P being cut or not.

For another example, the input interface to accept the user's inputs may not necessarily be limited to the touch-panel display 95, but hardware buttons or switches may replace or may be added to the touch-panel display 95.

For another example, appearance of the screen to be displayed in the touch-panel display 95 while the latter image G is being formed in the supplemental printing action may not necessarily be limited to the appearance as illustrated in FIGS. 6A-6B. For example, an area of the sheet P containing the latter image G having been formed so far alone may be displayed while the other area, in which the latter image G is not yet formed, may not be displayed in the screen.

For another example, the embodiments described above may not necessarily be applied to the printer 100 but may be applied to any image forming apparatuses in the inkjet-printing style, such as multifunction peripheral machine and copier and to any image forming apparatuses in a laser-printing style that may form the images G in toners on the sheet P.

What is claimed is:

1. An image forming apparatus, comprising:
    a medium storage for storing a sheet-formed medium;
    a medium conveyer configured to convey the sheet-formed medium from the medium storage along a predetermined conveying direction;
    an image forming device configured to form an image on the sheet-formed medium being conveyed by the medium conveyer;
    a user input interface configured to accept input from a user; and
    a controller configured to:
        operate the image forming device and the medium conveyer to perform a first action, in which the image forming device and the medium conveyer in conjunction with each other form an image composed of image data received from an external device in an area on the sheet-formed medium from one side of the image in a lengthwise direction toward the other side of the image, the lengthwise direction corresponding to the predetermined conveying direction; and
        on a condition where the first action is aborted, operate the image forming device and the medium conveyer to perform a second action, in which the image forming device and the medium conveyer in conjunction with each other form an image composed of the image data in another area on the sheet-formed medium different from the area in which the image was formed in the first action from the other side of the image in the lengthwise direction toward the one side of the image until a time point instructed by input from the user accepted through the user input interface.

2. The image forming apparatus according to claim 1, further comprising a display,
    wherein the controller is configured to operate the display to display a part of the image having been formed on the sheet-formed medium in the second action and refresh the image being displayed according to progress of the image formed in the second action.

3. The image forming apparatus according to claim 1, further comprising a cutter configured to cut the sheet-formed medium,
    wherein the controller is configured to operate the cutter to cut the sheet-formed medium after aborting the first action and before starting the second action.

4. The image forming apparatus according to claim 1, further comprising a cutter configured to cut the sheet-formed medium,
    wherein the controller is configured to operate the cutter to cut the sheet-formed medium after terminating the second action.

5. The image forming apparatus according to claim 1, wherein the controller is configured to operate the medium conveyer to convey the sheet-formed medium in the second action at a speed lower than a speed to convey the sheet-formed medium in the first action.

6. The image forming apparatus according to claim 1, wherein, while the controller operates the image forming device and the medium conveyer to form the image on the sheet-formed medium and convey the sheet-formed medium for performing the second action continuously, in response to the user input interface accepting the input from the user for terminating the second action, the controller is configured to operate the image forming device and the medium conveyer to terminate the second action according to the time point when the user input interface accepts the input from the user.

7. The image forming apparatus according to claim 1, wherein, while the controller operates the image forming device and the medium conveyer to form the image on the sheet-formed medium, convey the sheet-formed medium, and pause for performing the second action intermittently, in response to the user input interface accepting the input from the user for terminating the second action during a pause, the controller is configured to operate the image forming device and the medium conveyer to terminate the second action.

8. The image forming apparatus according to claim 7, wherein the controller is configured to, for each of the first action and the second action, operate the image forming device to reciprocate in a plurality of runs along a direction orthogonal to the predetermined conveying direction and forming the image on the sheet-formed medium while reciprocating, and the controller is configured to operate the image forming device and the medium conveyer to perform the second action intermittently by repeating a series of:
  moving the image forming device for at least one run in the direction orthogonal to the predetermined conveying direction and forming the image on the sheet-formed medium while moving;
  conveying the sheet-formed medium along the predetermined direction; and
  pausing.

* * * * *